United States Patent
Yu

(10) Patent No.: US 6,538,886 B2
(45) Date of Patent: Mar. 25, 2003

(54) HARD DISK DRIVER CASING BOTTOM-MOUNTED HEAT SINK

(76) Inventor: Chung Che Yu, 5F-23, 70, Fu-Shing Road, Taoyuan (TW)

( * ) Notice: Subject to any disclaimer, the term of this patent is extended or adjusted under 35 U.S.C. 154(b) by 0 days.

(21) Appl. No.: 09/836,189

(22) Filed: Apr. 18, 2001

(65) Prior Publication Data

US 2002/0154479 A1 Oct. 24, 2002

(51) Int. Cl.7 .................................................. H05K 7/20
(52) U.S. Cl. ...................... 361/695; 361/687; 361/690; 361/694; 174/16.1; 174/16.3; 165/80.3; 165/122; 454/184
(58) Field of Search ................................. 361/683, 685, 361/687, 690, 695; 174/15.1, 16.1, 16.3; 165/80.2, 80.3, 104.33, 122; 454/184; 312/223.1, 223.2

(56) References Cited

U.S. PATENT DOCUMENTS

| | | | | |
|---|---|---|---|---|
| 5,062,016 A | * | 10/1991 | Zupancic | 360/97.01 |
| 5,171,183 A | * | 12/1992 | Pollard et al. | 454/184 |
| 5,694,290 A | * | 12/1997 | Chang | 361/685 |
| 6,185,097 B1 | * | 2/2001 | Behl | 361/695 |
| 6,252,770 B1 | * | 6/2001 | Yu et al. | 361/695 |
| 6,272,011 B1 | * | 8/2001 | Chen | 361/685 |
| 6,316,718 B1 | * | 11/2001 | Lin | 174/17 VA |

* cited by examiner

*Primary Examiner*—Boris Chervinsky
(74) *Attorney, Agent, or Firm*—Troxell Law Office PLLC

(57) ABSTRACT

A bottom-mounted heat sink in a hard disk driver casing includes a base casing, a base, a cover, a faceplate and a heat sink. Multiple slots are provided on the cover, the base is slide fitted to the base casing and the faceplate is locked to a front of the base. A hot air outflow is provided on the faceplate. A gradation is respectively provided in both inner sides of the base to accommodate a partition for the heat sink. At least one fan is fixed in place to a frame having side air outflow beneath the partition. The heat sink is provided at the bottom in parallel with the hard disk driver to achieve a larger and direct contact area with the hard disk driver to draw hot air generated by the hard disk driver, and to bring in cool air into the hard disk driver casing for completing an air convection cycle.

1 Claim, 4 Drawing Sheets

HARD DISK DRIVER CASING BOTTOM-MOUNTED HEAT SINK

BACKGROUND OF THE INVENTION (a) Field of the Invention

The present invention relates to a bottom-mounted heat sink in a hard disk driver casing of a CPU, and more particularly, to one that effectively expels hot air generated by the hard disk driver and its peripherals.

(b) Description of the Prior Art

A heat sink mounted in a hard disk driver casing generally available in the market is comprised of a hard disk casing, a fan and a foldable faceplate. The fan is locked behind the faceplate to draw out hot air generated by the hard disk driver. However, field tests demonstrate that said fan could only draw a small amount of hot air present in the front and both sides of the hard disk driver. The hard disk is provided by extension in a CPU and is almost enclosed inside the hard disk casing. A temperature rise is well expected from the hard disk driver while operating and one or two fans provided on the faceplate are insufficient to effectively achieve cooling of the hard disk driver.

SUMMARY OF THE INVENTION

The primary purpose is to provide a heat sink that is mounted beneath and in parallel with a hard disk driver in a CPU. It has a direct and wider contact with the hard disk driver to forthwith expel hot air created by the hard disk driver and bring in cool air to a hard disk driver casing for achieving air convection. Mass hot air created in the peripheral of the hard disk driver is also expelled at the same time to maintain both of the hard disk driver and the CPU operating at a safe working temperature.

Another purpose of the present invention is to provide the heat sink having vertically arranged flush blades that allow the fan to be made ultra thin, consuming less space and completely expelling hot air from its sides.

DETAILED DESCRIPTION OF THE PREFERRED EMBODIMENTS

Figure 1:
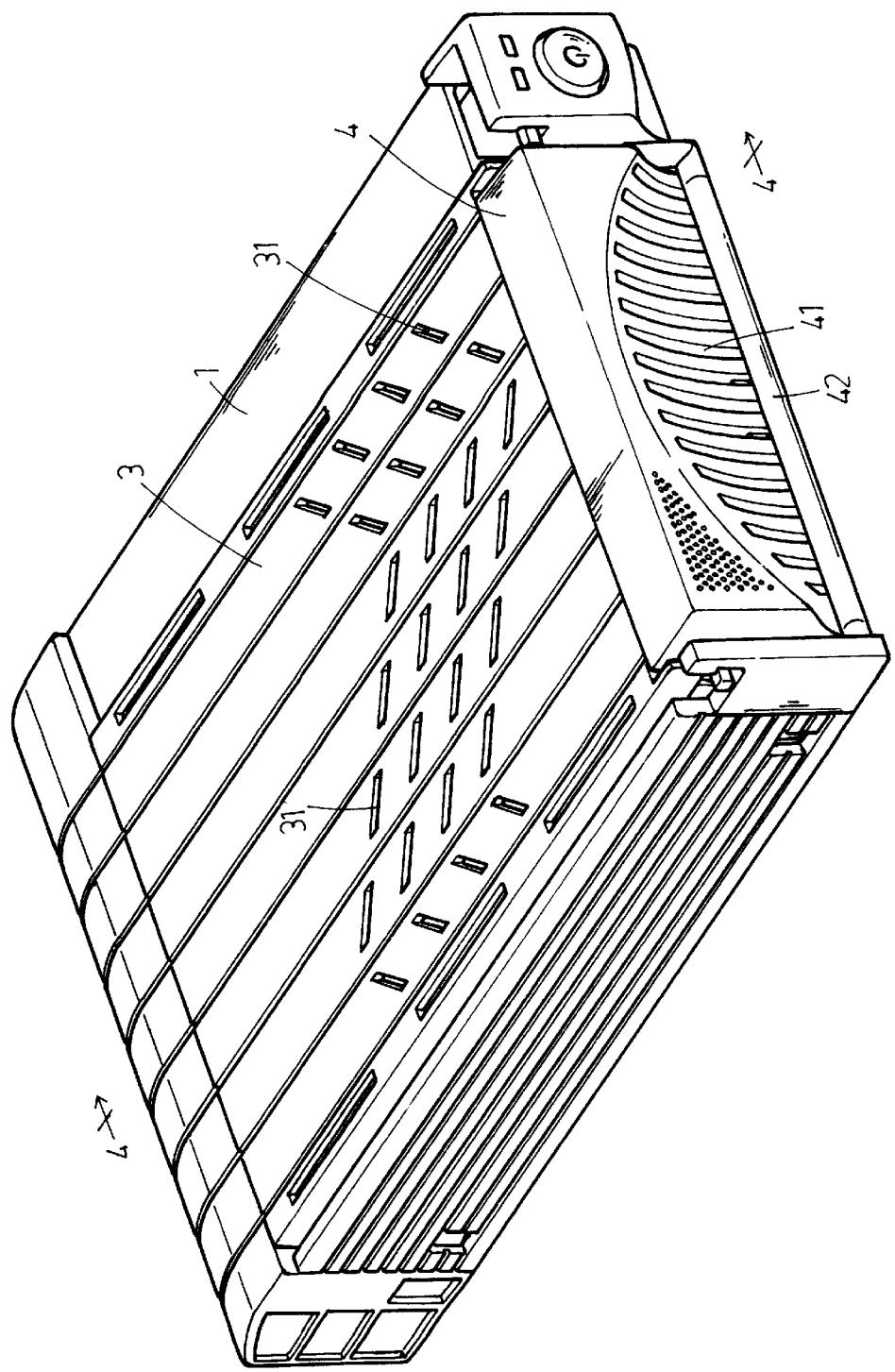
FIG. 1 is a view showing the appearance of the present invention.
Figure 2:
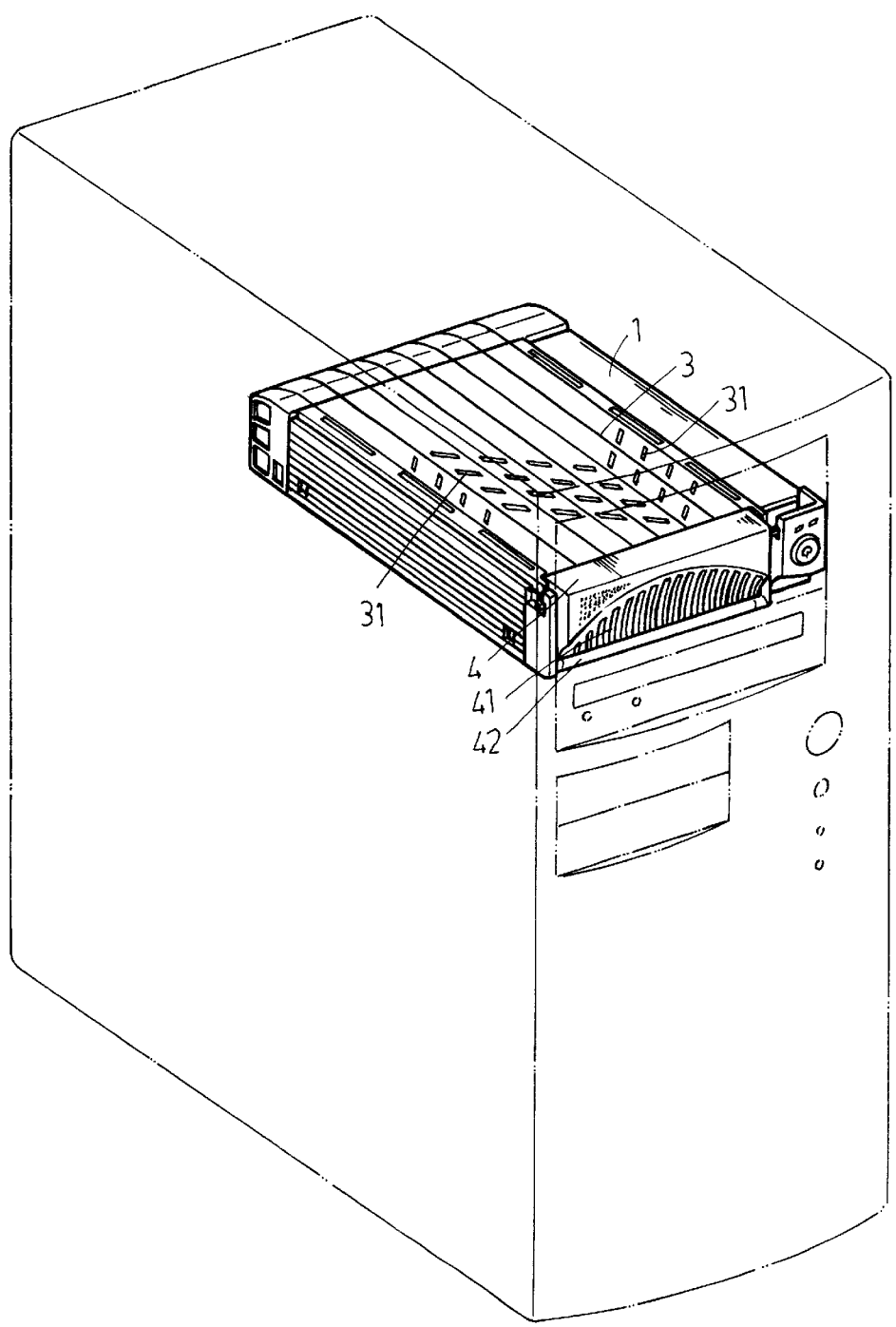
FIG. 2 is an elevation view of a preferred embodiment of the present invention.
Figure 3:
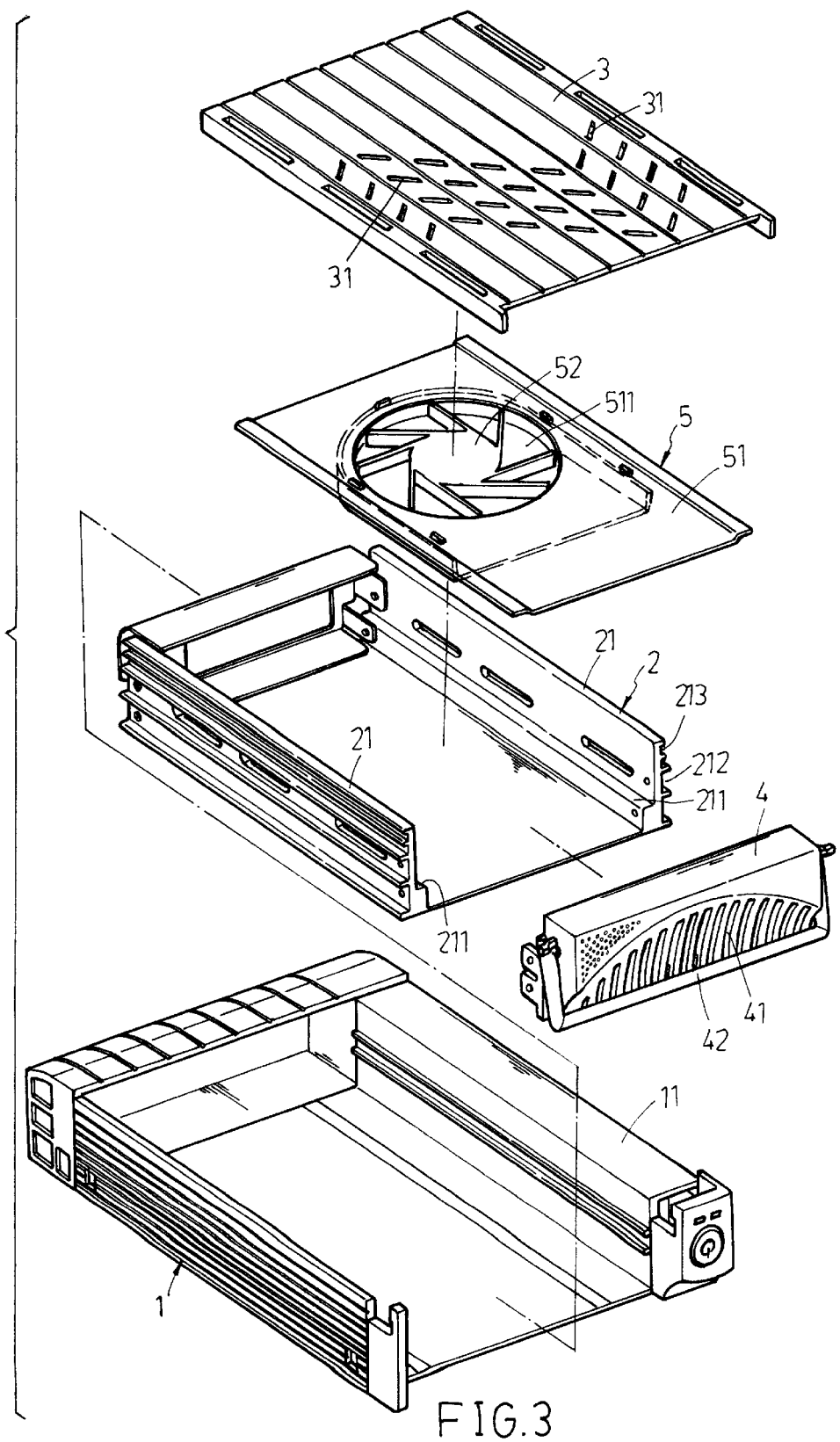
FIG. 3 is an exploded view of the preferred embodiment of the present invention.

Referring to FIGS. 1, 2 and 3, a hard disk driver casing provided inside a CPU is comprised of a base casing 1, a base 2, a cover 3, a faceplate 4 and a heat sink 5. Within, multiple channels 212 provided externally on both side frames of the base 2 respectively slide fit with inner slide rails 11 of the base casing 1. A gradation 211 is provided internally on both side frames 21 to receive the heat sink 5 with a partition 51. A sliding block (not illustrated) provided on both inner sides of the cover 3 engage a corresponding slide 213 on side frames 21 to incorporate the cover 3 with the base 2. The faceplate 4 is locked in position to a front end of the base 2 and a handle 42 is provided on the faceplate 4 to carry the hard disk driver casing.

Figure 4:
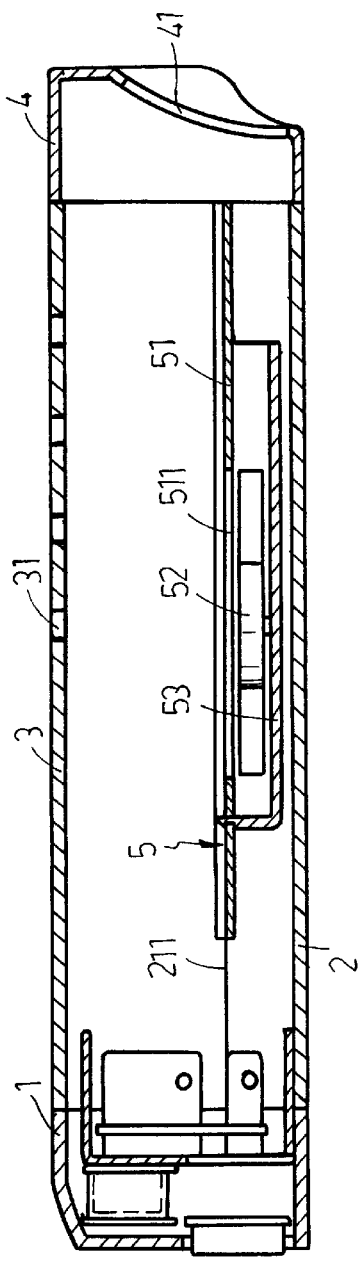
FIG. 4 is a sectional view taken from Line 4—4 and in the direction as indicated by arrows in FIG. 1 of the present invention.
Figure 5:
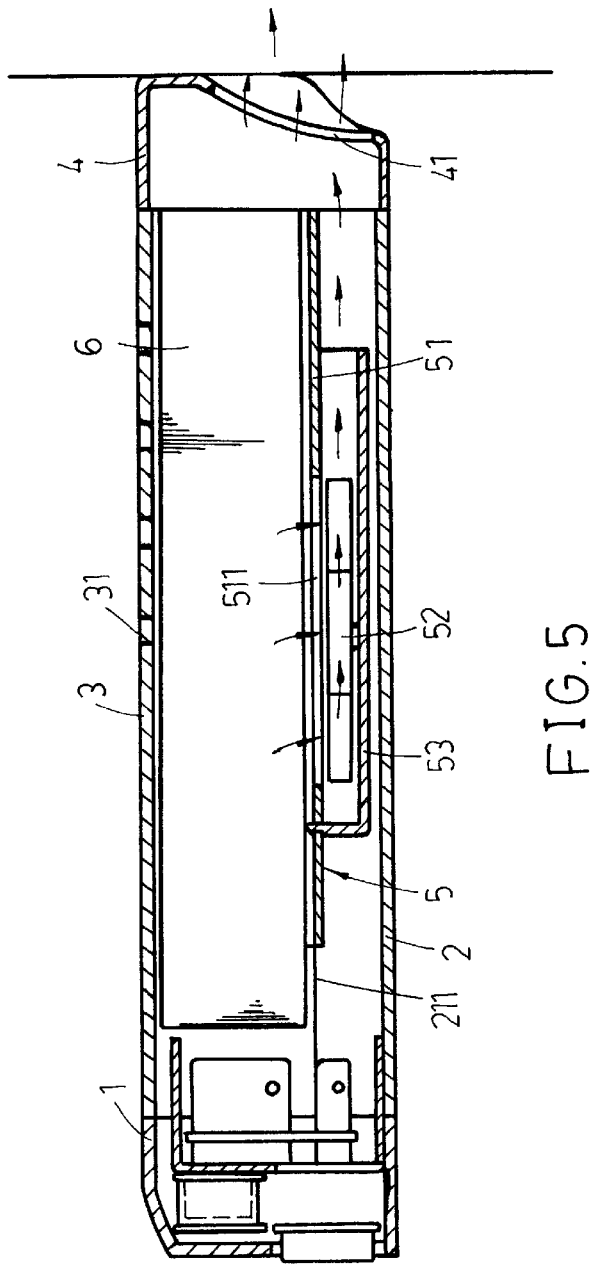
FIG. 5 is a sectional view showing how the present invention expels hot air generated by a hard disk driver.

Now referring to FIGS. 3, 4 and 5, multiple slots 31 are provided on the cover 3, a hot air outflow 41 is provided on the face plate 4 and a hard disk driver 6 is fixed in place above the heat sink. When fan 52 in the heat sink 5 operates, cool air is brought in through an air inflow 511 provided on the partition 51 and said multiple slots 31 to cool the hard disk driver while the hot air is expelled from the hot air outflow 41.

Said heat sink 5, also a patent already filed by the same inventor of the present invention, contains at least one fan 52 which is fixed in position by a frame 53 having a side air outflow for the fan 52. Blades in said heat sink 5 are flush and arranged in a whirling pattern. As the blades turn, an air current drawn will be completely expelled along the surface of each fan blade without any portion of the air current passing upwardly as observed in the traditional blade having a certain inclination.

By having the heat sink 5 directly mounted beneath the hard disk driver 6 in the hard disk casing as disclosed above, it is able to effectively and directly expel the hot air generated by the hard disk driver 6 with a larger working area. Meanwhile the bottom-mounted heat sink also expels the hot air created in the peripheral of the hard disk driver 6. The present invention substantially achieves the purpose of ai convection in a better, more efficient and practical way than does by a heat sink of the prior art that is front mounted.

What the invention claimed is:

1. A bottom-mounted heat sink for a hard disk driver comprising:
   a) a base casing;
   b) a base mounted in the base casing, the base having a bottom and configured to receive therein a hard disk driver spaced from the bottom;
   c) a faceplate mounted to a front portion of the base, the faceplate having hot air outflow openings therethrough;
   d) a cover mounted to the base, the cover having a plurality of slots therethrough; and,
   e) a fan assembly mounted in the base, the fan assembly including a partition, a frame on the partition and a fan on the frame, whereby a plane of the fan is adjacent to the bottom of the base, the frame having a side air outflow facing toward the faceplate.

* * * * *